United States Patent
Grasselli

(10) Patent No.: US 9,751,233 B2
(45) Date of Patent: Sep. 5, 2017

(54) INDUSTRIAL SLICER

(71) Applicant: Giorgio Grasselli, Albinea (IT)

(72) Inventor: Giorgio Grasselli, Albinea (IT)

(73) Assignee: GRASSELLI S.P.A., Albinea (IT)

( * ) Notice: Subject to any disclaimer, the term of this patent is extended or adjusted under 35 U.S.C. 154(b) by 235 days.

(21) Appl. No.: 14/713,406

(22) Filed: May 15, 2015

(65) Prior Publication Data

US 2015/0336285 A1 Nov. 26, 2015

(30) Foreign Application Priority Data

May 22, 2014 (IT) .............................. MO2014A0142

(51) Int. Cl.
*B26D 7/26* (2006.01)
*B26D 7/06* (2006.01)
*A22C 17/00* (2006.01)
*B26D 1/52* (2006.01)
*B26D 5/00* (2006.01)

(52) U.S. Cl.
CPC ........ *B26D 7/2628* (2013.01); *A22C 17/0033* (2013.01); *B26D 1/52* (2013.01); *B26D 5/007* (2013.01); *B26D 7/0625* (2013.01); *B26D 2210/00* (2013.01); *Y10T 83/538* (2015.04); *Y10T 83/6603* (2015.04); *Y10T 83/949* (2015.04)

(58) Field of Classification Search
CPC . Y10T 83/949; Y10T 83/538; Y10T 83/6603; Y10T 83/6628; Y10T 83/8821; Y10T 83/141; Y10T 83/162; Y10T 83/7158; Y10T 83/7164; Y10T 83/869; Y10T 83/9454; Y10T 83/9292; Y10T 83/8831; Y10T 83/8843; Y10T 83/929; Y10T 83/472; Y10T 83/6587; Y10T 83/6588; Y10T 83/8828; Y10S 83/932; B26D 7/2628; B26D 7/0625; B26D 1/52; B26D 1/45; B26D 1/50; B26D 1/505; B26D 1/525; B26D 1/54; B26D 1/543; B26D 5/007; B26D 2210/00; B26D 2210/02; B26D 2210/06; B26D 2001/0013; B26D 2001/0033; B26D 3/28; A22C 17/0033
See application file for complete search history.

(56) References Cited

U.S. PATENT DOCUMENTS 3,212,376 A * 10/1965 Berenbak ............. B23D 49/006
83/578
3,277,754 A * 10/1966 Lopez .................... B26D 3/006
30/116

(Continued)

FOREIGN PATENT DOCUMENTS

EP 2807928 A1 12/2014
FR 2835773 A1 8/2003

(Continued)

*Primary Examiner* — Phong Nguyen
(74) *Attorney, Agent, or Firm* — Pearne & Gordon LLP

(57) ABSTRACT

An industrial slicer comprises: a cutting station (1) that includes a plurality of blades (21, 22, 23) for slicing a food product, which blades (21, 22, 23) are spaced apart from each other by a cutting pitch, so as to obtain slices of said product having a thickness corresponding to the cutting pitch.
The slicer also comprises adjustment means (5, 7, 3, 31, 41) for adjusting the distance between the blades (21, 22, 23).

8 Claims, 6 Drawing Sheets

(56) References Cited

U.S. PATENT DOCUMENTS

| | | | |
|---|---|---|---|
| 3,956,518 A * | 5/1976 | Goldbach | A23C 19/0908 426/144 |
| 6,647,848 B1 | 11/2003 | Bruner | |
| 6,655,248 B1 * | 12/2003 | Johnson | B26D 1/553 225/103 |
| 8,220,373 B1 * | 7/2012 | Husting | B26D 1/553 83/130 |
| 2006/0185488 A1 * | 8/2006 | Short | B26D 1/553 83/581.1 |
| 2014/0352505 A1 | 12/2014 | Grasselli | |

FOREIGN PATENT DOCUMENTS

| | | | |
|---|---|---|---|
| FR | 2924970 A1 | 6/2009 |
| GB | 2480480 A | 11/2011 |

\* cited by examiner

INDUSTRIAL SLICER

FIELD OF THE INVENTION

The present invention relates to an industrial slicer.

In particular the present invention relates to an industrial slicer especially intended for use in the food industry for cutting products such as meat, poultry, fish, vegetables, both fresh and cooked, preferably free of bones or cartilage.

DESCRIPTION OF RELATED ART

There are known industrial slicers used for cutting products destined, by way of example, to the large-scale distribution (GDO), as well as to school or company canteens, or catering.

One slicer of the known type comprises a cutting station arranged downstream of a machine section, which cutting station pushes the products towards the cutting section and comprises a lower conveyor belt for carrying the product to the cutting station and a top belt, arranged above the conveyor belt, which has the function of pressing the product.

The cutting station comprises a plurality of horizontal blades, often mounted opposite a terminal end of the top belt, under which blades the conveyor belt extends in such a way that the product pushed into contact with the blades is automatically cut into slices.

A version of this type of machine comprises a so-called "floating" top belt, that is connected to a mechanism for regulating the pressure exerted on the product.

This first machine version is designed for producing a variable number of slices with constant thickness, plus one residue.

There also exists a second version of the machine provided with a stationary top belt which produces a fixed number of slices with variable thickness without any residues being left.

In fact, in the second version of the machine, the thickness of the different slices depends on the different size of the product.

These solutions of the known type exhibit several drawbacks.

Besides the slices, the first machine version mentioned above leaves a residue which significantly impacts on the production costs.

The second version produces slices of variable quality and uneven size.

Furthermore, the second machine version must necessarily perform a calibrated cutting of the product, that is to say that the mechanical performance conditions of the cutting, such as speed, thrust intensity and pressure, are to be adjusted according to a weight range of the product to be cut; and calibration significantly affects production costs.

Additionally, there are two more major drawbacks shared by the slicing machine versions of the known type.

The first one is that, whenever the thickness of the slices must be varied, the production line is to be stopped in order for the operator to disassemble the blades and predispose the same at different mutual distances.

The second drawback related to the first one is that the manual intervention on the blades can result in risks for operator's safety due to the fact that he might get hurt during this manual operation; the operator shall therefore be duly trained so as to limit the above risk, which again has a significant impact on costs.

The technical task at the base of the present invention is therefore to provide a slicer capable of overcoming the drawbacks of the prior art mentioned above.

The technical task is achieved by the slicer designed according to claim 1.

BRIEF DESCRIPTION OF THE DRAWINGS

Further features and advantages of the present invention will more clearly emerge from the indicative and therefore not limiting description of a preferred but not exclusive embodiment of a slicer as illustrated in the appended drawings wherein.

DETAILED DESCRIPTION OF PREFERRED EMBODIMENTS OF THE INVENTION

Figure 1:
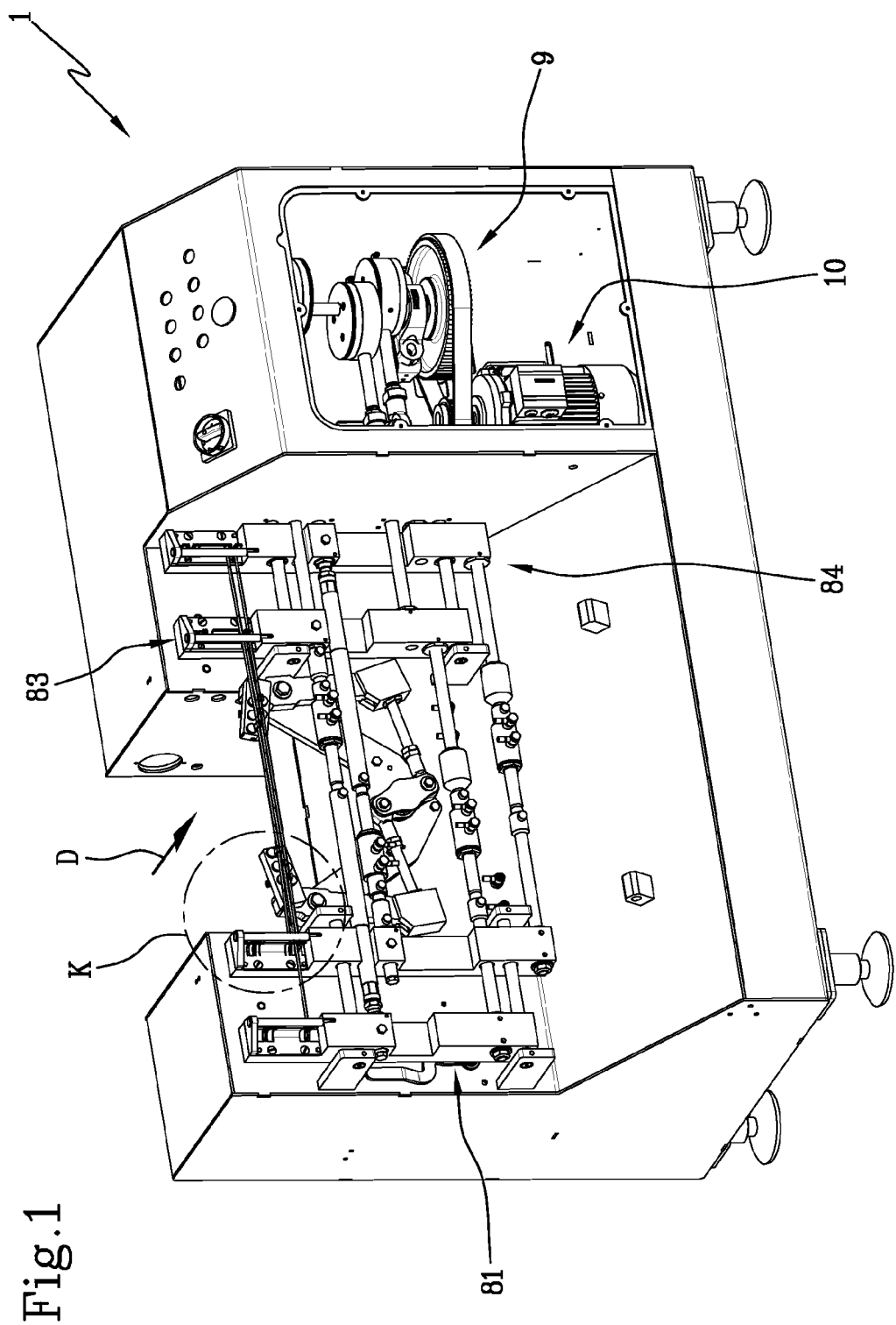
FIG. 1 is an isometric view of the cutting station of the slicer disclosed by the invention.

With reference to the above figures, it is indicated by 1 the cutting station of an industrial slicer according to the invention.

In detail, as anticipated, the slicer disclosed herein is especially designed for cutting food items such as meat, poultry, fish, vegetables, both fresh and cooked, preferably free of bones or cartilage.

Besides the cutting station 1 being the object of the invention herein, the slicer can be such as that disclosed in European patent application n. EP14162251 incorporated herein by reference.

The slicer includes, amongst others, a supply station located upstream of the cutting station 1 which brings the products to be sliced to the cutting station 1 one at a time.

The slicer is further provided with an output station located downstream of the cutting station 1 via which the slices are removed from said cutting station 1 and directed out of the slicer.

In particular, the machine of the invention herein can include a conveyor 11, for example in the form of a lower conveyor belt 11, as described in the explanation of the prior art, which conveyor 11 brings the intact products to the cutting station 1 along a forward direction indicated with D in the attached figures.

The cutting station 1 comprises a plurality of blades 21, 22, 23 for slicing incoming products, which blades 21, 22, 23 are spaced apart from each other at any given time by a given cutting pitch, thereby obtaining slices having a thickness corresponding to said cutting pitch.

The blades 21, 22, 23 may be for example made up of steel and preferably three in number.

Said conveyor belt can be arranged in such a way as to extend below the blades 21, 22, 23 so that the product is placed in contact therewith thus being sliced.

According to a very important aspect of the invention, the cutting station 1 includes adjustment means 5, 7, 3, 31, 41 enabling the blades 21, 22, 23 to have a mutual distance so that the thickness of the slices can be varied.

In short, the thickness of the slices can be adjusted according to the user's needs and in particular to the different sizes of the single products, without the user having to disassemble and reassemble the blades each time.

In other words, the slicer includes movable blades 21, 22, 23 which position is subject to adjustment means.

In the present description the position of the blades 21, 22, 23 can be meant as the spatial deviation of at least one portion thereof due to a flexing action.

This aspect will be detailed later on, that is when explaining the working principles of the invention herein.

Preferably, the above conveyor, which is however configured, defines a horizontal conveying plane above which the blades 21, 22, 23 are located.

The blades 21, 22, 23 are preferably substantially horizontal and parallel to each other, at least along a section within which they come in contact with the products.

In detail, the blades 21, 22, 23 may be arranged one above the other, the lowermost blade being separate from the conveying plane by a distance corresponding to the cutting pitch at any given time.

In this case, the conveying plane is a fixed reference of the slicer for adjustment of the distance of the blades 21, 22, 23 as will be detailed in a later section.

In the preferred embodiment of the invention as represented in the appended drawings, the blades 21, 22, 23 may be arranged one over the other thereby forming a sort of vertical cutting plane through which the intact products cross thus being separate in slices.

In this case, the blades 21, 22, 23 are movable along the cutting plane according to the adjustment performed by the adjustment means.

Figure 2:
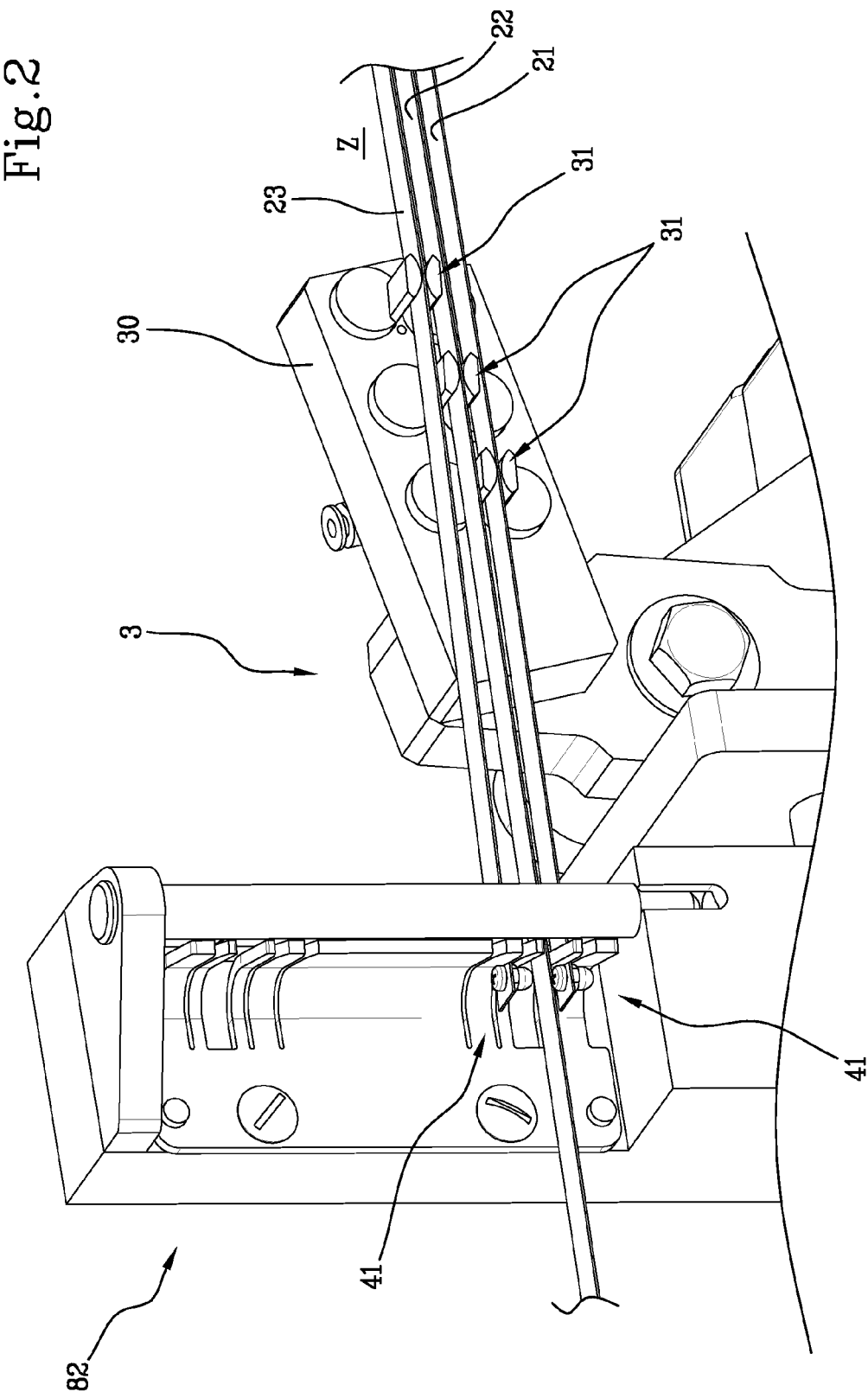
FIG. 2 is an enlarged view of the particular K of FIG. 1.
Figure 3:
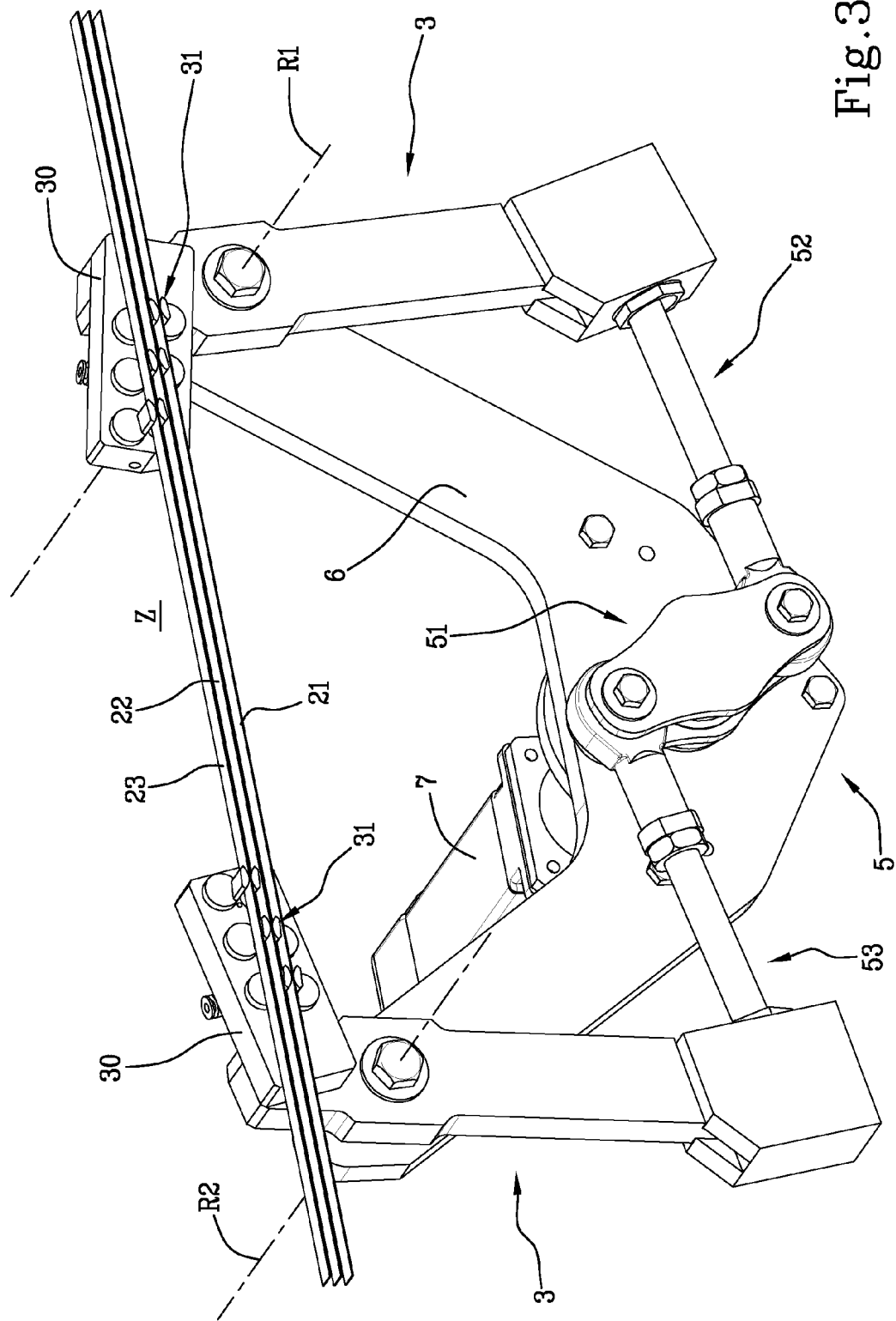
FIGS. 3 and 4 are isometric views of the main components of the adjustment means of the invention isolated from the cutting station, represented in two different operating configurations.
Figure 4:
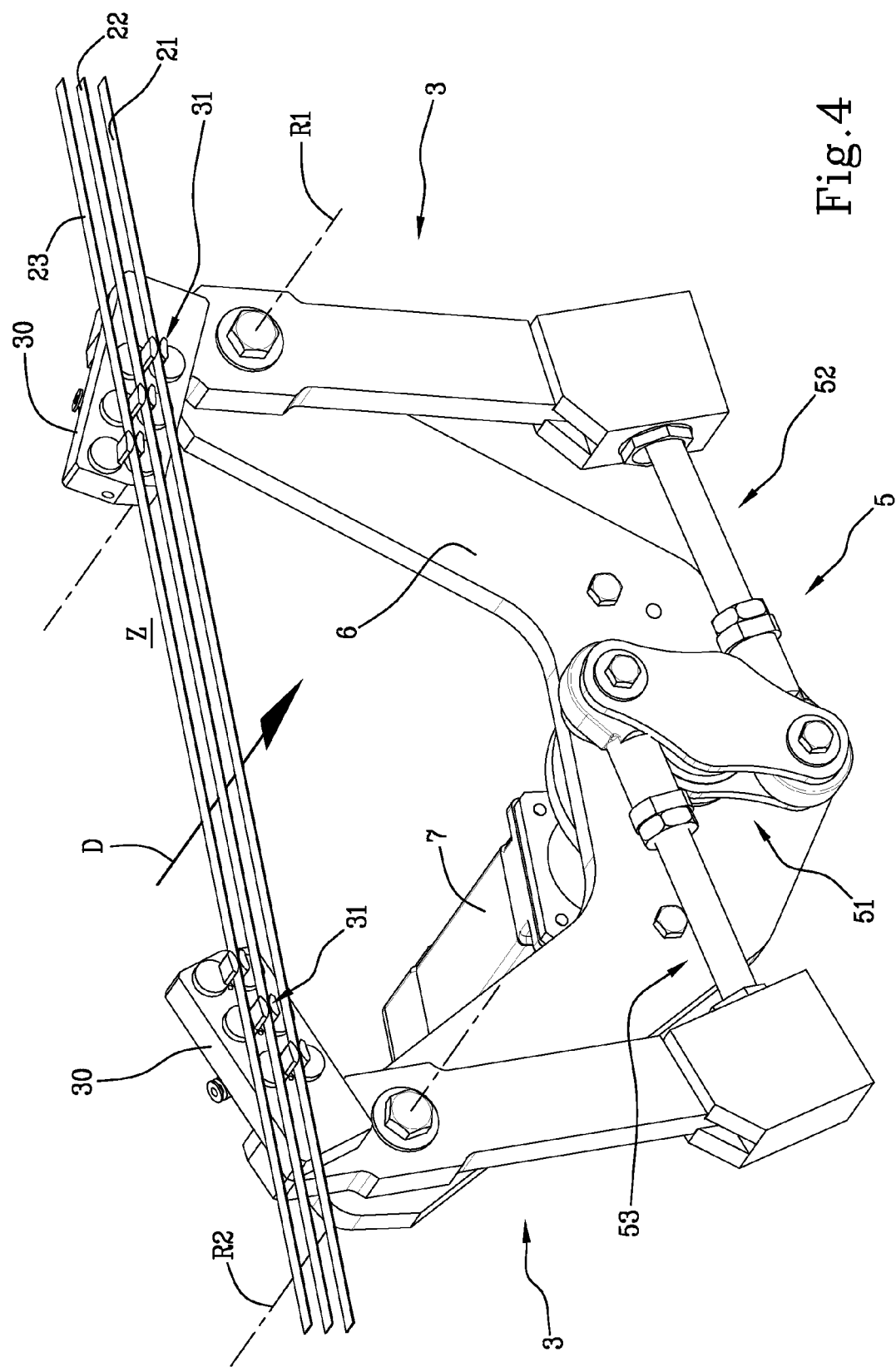

According to a preferred constructive aspect, the adjustment means includes movable shifter elements 31 which can be seen in detail in FIGS. 2-4, each associated with a respective blade.

Said shifter elements 31 are suitable for abutting the respective blades 21, 22, 23 thus varying the cutting pitch according to their position.

In the example shown in the attached drawings, each shifter element 31 is formed by a pair of shaped blocks able to come into contact with the respective blade from opposite sides so as to bend it thus moving it with respect to the conveying plane and to the other blades 21, 22, 23.

The shifter element 31 can be arranged substantially in the cutting plane. In this case, the blocks can be opposed and have a distance such as to enable to contain the blades 21, 22, 23 keeping a mechanical clearance so as to hold them in position, yet allowing axial sliding thereof, or at least sliding in a direction being substantially parallel to their length due to reasons which are being detailed below.

A further embodiment, not shown, is also possible wherein the shifter elements 31 comprise a single shaped block for each blade, being in contact with the corresponding lowermost surface of the respective blade.

In any case, each shaped block preferably comprises a curved contact surface intended for abutment with the respective blade.

Furthermore, each blade is coupled to the cutting station 1 at two distinct coupling points of the length thereof, for example at or near the ends thereof.

The adjustment means preferably comprises a plurality of elastic coupling elements which hold the blades 21, 22, 23 relative to said coupling points (see FIG. 2).

In the example shown, the coupling elements comprise a plurality of clamps 41 made of an elastic material such as steel, which are able to tighten the blades 21, 22, 23 relative to the coupling points, each of said clamps being formed by a pair of opposed jaws adapted to elastically bend.

Therefore, the coupling elements cooperate with the shifter elements 31 thereby enabling adjustment of the blades 21, 22, 23 due to bending of the blades themselves 21, 22, 23 as a result of a displacement in space of the shifter elements 31 themselves.

In a possible embodiment of the invention, the coupling elements are formed by vertical supporting plates 81, 82, 83, 84 holding the blades 21, 22, 23.

In this case, the clamps 41 can be identified by horizontal slots made on the supporting plates 81, 82, 83, 84 thus forming thin strips constituting aforementioned jaws.

Each blade is supported by two supporting plates 81, 82, 83, 84 which are connected by hydraulic pistons 91 or the like, being designed for positioning and maintaining said plates 81, 82, 83, 84 at a mutual distance such as to tension the blade according to manners known per se.

Figure 5:
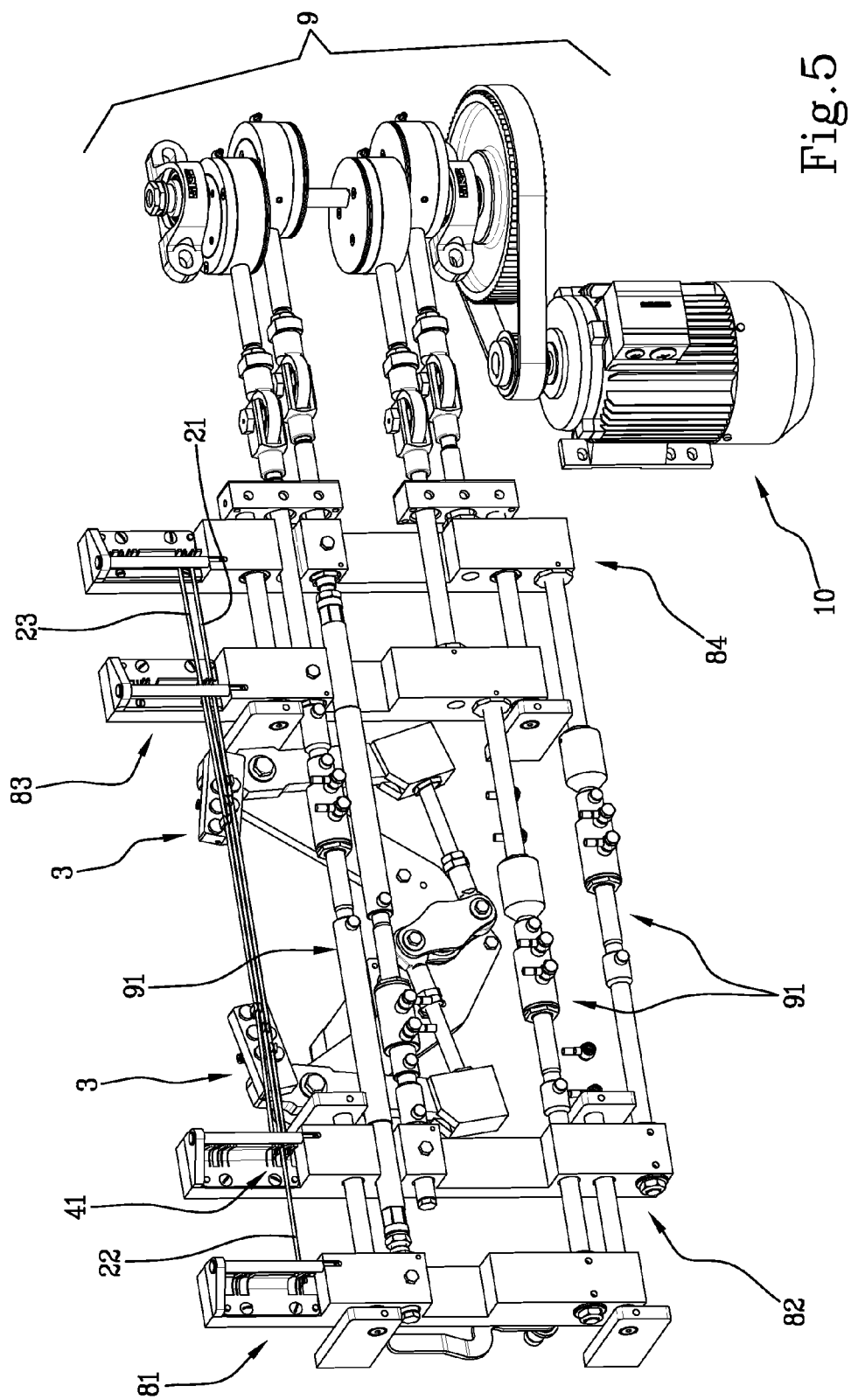
FIG. 5 is an isometric view of the movable parts and of the kinematic mechanisms of the cutting station.
Figure 6:
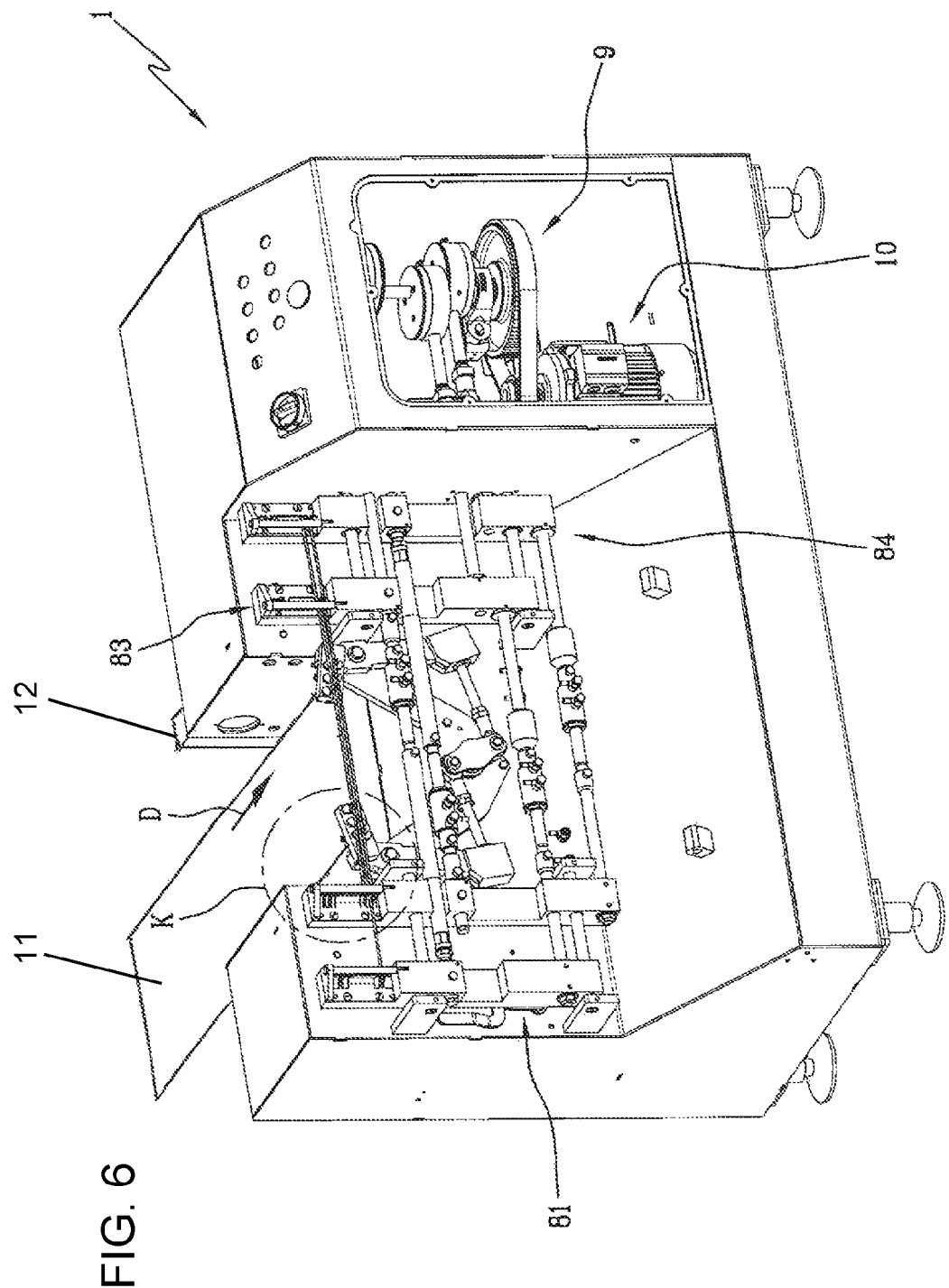
FIG. 6 is an isometric view of the cutting station similar to FIG. 1.

Following this operation, each pair becomes an integral unit able to perform a rigid lateral translation (see FIG. 5).

In fact, in order for the slices to be cut, the blades 21, 22, 23 can be subject to a horizontal reciprocating movement, thereby causing relative plates 81, 82, 83, 84 to be shifted via a shaft connecting rod 9, such as that shown in FIGS. 1 and 5, driven by a motor 10.

In detail, the above shaft can be configured for moving the different integral units as previously defined based on cycles involving periods of equal duration but out of phase. Said integral units may be interleaved so that one of the plates which supports one of the blades is interposed between the plates supporting two different blades and vice versa (see again FIG. 5).

As mentioned above, the shaped blocks of the shifter elements 31, when interfacing one another, may retain the relative blade with mechanical clearance in order for it to be allowed to perform its axial stroke according to aforesaid reciprocating movement.

In the embodiment of the invention herein, the adjustment means comprises at least one adjustment arm 3 (preferably two), equipped with shifter elements 31, which adjustment arm is rotatably mounted in the cutting station 1 thereby varying the cutting pitch according to its angular position.

To be precise, the adjustment arm 3 is hinged at an axis of rotation perpendicular to the cutting plane.

In the illustrated example, there are provided two adjustment arms 3 spaced apart from each other so as to define a crossing zone Z therebetween for the products to be sliced, at which the blades 21, 22, 23 exhibit an adjusted cutting pitch.

The adjustment arms 3 may be specular relative to an intermediate plane arranged in the crossing zone Z, said plane being perpendicular to the cutting plane.

This will ensure that the blades 21, 22, 23 will always be substantially rectilinear, in particular horizontal, so as to allow a smooth and clean cutting of the slices at least relative to one of the sections thereof comprised in said crossing zone Z, regardless of the different positions assumed by the arms and thus by the different cutting pitches chosen.

Each adjustment arm 3 can consist of one or more plates conforming said shifter elements 31 relative to a distal free portion 30.

Alternatively, the shifter elements 31 can be fixed to said arm's distal portion 30.

In both cases, the shifter elements 31 may protrude transversely from said distal portion which is disposed in a plane parallel to said cutting plane. According to a preferred aspect of the invention as shown in particular in FIGS. 3 and 4, the adjustment means also comprises a mechanism 5 able to move the two adjustment arms 3 synchronously so that they undergo angular displacements with same size but with opposite directions with respect to the axis of rotation thereof.

In this context, with opposite directions it is meant the clockwise or counterclockwise direction of rotation.

In the preferred constructive form, the mechanism 5 mentioned comprises a lever element 51 that is centrally hinged so as to define two lever arms, and two connecting rods 52, 53, each being rotatingly coupled with a respective lever arm at one end and with a respective adjustment arm 3 at the other end.

The lever element 51, which can have the form of a pair of elongated parallel plates, rotates about an axis being parallel to the axes of rotation of the adjustment arms 3.

In detail, in the preferred embodiment, both the lever element 51 and the arms are hinged to the same metal support sheet 6 which in the attached figures has a V-shape and is fixed within the cutting station 1, that is to say that it is directly fixed to the frame of the slicer, which in turn is fixed to and supported by the base.

The activation mode of the mechanism 5 and the arms 3 are discussed here below in the explanation of the invention working principles.

According to a preferred aspect of the invention, the shifter elements 31 of each arm are arranged on respective different circumferences which center is relative to the axis of rotation of the respective arm.

In detail, the circumferences on which the shifter elements 31 of the same arm lie, are concentric.

Moreover, these radiuses are determined in the following manner.

By identifying the blades 21, 22, 23 from the lowest to the highest one with a consecutive natural number starting from one (1, 2, 3, etc.), following a change in the cutting pitch, the size of the shift that each blade must carry out with respect to the previous position, is determined by the following formula: $S_N = \Delta S_1 \times N$ wherein N is said consecutive number, $\Delta S_1$ is the shift in the position of the first blade relative to said conveying plane as a result of said change in the cutting pitch, and $S_N$ is the shift in the position of the blade number N, also following the change in the cutting pitch.

In practice, assuming that the cutting station 1 includes three blades 21, 22, 23 with a cutting pitch equal to 5 mm, then the following will result: a first blade 21 positioned 5 mm from the conveying plane (that is, from abovementioned lowermost belt), a second blade 22 located 10 mm from the conveying plane, and a third blade 23 arranged 15 mm from the conveying plane.

Assuming that a cutting pitch of 8 mm is needed, than $\Delta S_1$ will be equal to 3 mm.

Therefore, the first blade 21 shall be arranged 8 mm from the conveying plane that is, it shall be shifted by 3 mm ($S_1 = \Delta S_1 \times 1$), $S_N = \Delta S_1 \times N$ whereas the second blade 22 shall be arranged 16 mm from the conveying plane and thus it shall be moved by 6 mm ($S_2 = \Delta S_1 \times 2$), finally, the third blade 23 shall be placed 24 mm from the conveying plane, and will therefore be shifted by 9 mm ($S_2 + \Delta S_1 \times 3$).

In the preferred embodiment of the invention, the adjustment of the blades' 21, 22, 23 cutting pitch is carried out automatically.

In this case, the slicer afforded includes first and foremost detection means 12 for determining the size of the products to be sliced which are arranged upstream of the cutting station 1.

Such detection means 12 can be suitable for measuring the section of the product (typically the transversal section), which will be facing the cutting plane.

In this case, the detection means preferably includes a plurality of sensors, for example photocells or other type of sensors, predisposed for measuring the height and width of the products to be sliced thus identifying the sections thereof.

Also the length of the products can be detected to determine relevant volume. Optionally, the detection means may also include a device for measuring the weight of the products to be sliced.

Moreover, in this embodiment a processing unit connected to the detection means is made available which is configured for controlling the adjustment means so as to automatically change the distance between the blades 21, 22, 23, depending on the size of the products to be sliced on the basis of a slicing program.

With slicing program it is meant a control mode of the adjustment means according to the result to be obtained.

By way of example but not limited to, the slicing program which can be set or selected by the user, can afford to cut all the products in slices with same size, or in a predetermined and constant number of slices regardless of the size thereof, or in slices with same weight, etc.

In this embodiment, the processing unit can be connected to a motor, for example the brushless motor indicated by the numeral 7 in FIGS. 3 and 4, on which the above mentioned lever element 51 is fitted.

In practice, the processing unit, according to the size performed by the detection means, is adapted to control the rotation of the lever element 51 based on selected angles, so as to obtain displacement of the arms (and thus of the blades) corresponding to the programmed variation of the cutting pitch.

In an alternative embodiment, not shown, the slicer includes mechanical means for controlling the adjustment means operable by the user. In this case, one can speak of a manual adjustment by the user, performed by a kinematic mechanism which can always be connected to said lever element 51.

The working principles of the invention herein in its preferred embodiment, are explained hereinafter on the basis of FIGS. 3, 4 and 5.

Prior to supplying the slicer with the products to be cut, the blades 21, 22, 23 shall be pre-tensioned in the manner already explained above and the shaft connecting rod 9 activated in order to operate the above integral units formed by respective supporting pairs of plates 81, 82, 83, 84 which support the blades 21, 22, 23 elastically (see again FIG. 5). While the products to be cut are being gradually supplied to the slicer, the aforementioned detection means determine the size of each product, then communicating it to the processing unit.

Assume that two products of different sizes, the first one being thinner than the second one, are to be cut thus reaching the cutting station 1 one after the other and that the slicing program provides to obtain slices of the same size from all cut products.

In the moments before the first product reaches the cutting station 1, the processing unit controls the electric motor so that the position of the adjustment arms 3 is such that the blades 21, 22, 23 exhibit a cutting pitch able to obtain slices of constant size (see FIG. 3).

As soon as the second product reaches the cutting station, the processing unit controls rotation of the adjustment arms 3 which spread apart the blades 21, 22, 23 (see FIG. 4) by means of aforesaid shifter elements 31 so that, when the product having a thicker size crosses through abovementioned zone Z arranged on the cutting plane, the same is cut into slices which slices have dimensions corresponding to those of the thinner product.

It should be noted that the slicer herein disclosed is not only able to obtain slices uniform in size from products having different sizes, but it can do so without any product left as waste. This is due to the presence of the means of adjustment and to the fact that one of the slices obtained is the one being positioned between the conveying plane and the first lowermost blade (always having a distance equal to the cutting pitch).

Therefore, the slicer provided by the present invention allows slicing of the progressively incoming products on the basis of a predetermined and uniform quality, without the need to stop production for adjusting the cutting pitch and without any risks for the operator.

It follows that the slicer disclosed by the present invention fully goes beyond the limits of the known art.

The invention claimed is:

1. An industrial slicer comprising a cutting station (1) that includes a plurality of blades (21, 22, 23) for slicing a food product, said blades (21, 22, 23) being spaced apart from each other by a cutting pitch, so as to obtain slices of said product having a thickness corresponding to the cutting pitch, the slicer being characterised in that it comprises adjustment means (5, 7, 3, 31, 41) for adjusting the distance between the blades (21, 22, 23),
    wherein said adjustment means (5, 7, 3, 31, 41) includes a plurality of movable shifter elements (31) that are associated with respective blades, said shifter elements (31) being able to change the cutting pitch according to the position thereof; wherein said adjustment means (5, 7, 3, 31, 41) comprises at least a first adjustment arm (3) provided with said shifter elements (31), said arm being mounted rotatable in the cutting station (1), so as to change the cutting pitch according to the angular position thereof;
    the slicer further comprising a second adjustment arm (3) spaced apart from the first adjustment arm (3), so as to define a crossing zone (Z) therebetween for said products, at which the blades (21, 22, 23) have an adjusted cutting pitch;
    wherein the adjustment arms (3) are specular with respect to an intermediate plane positioned in said crossing zone (Z) and wherein the adjustment means (5, 7, 3, 31, 41) comprises a mechanism (5) able to move the adjustment arms (3) synchronously so that they undergo angular displacements with same size and with opposite directions with respect to the relative axis of rotation (R1, R2);
    wherein said mechanism (5) comprises a lever element (51) that is centrally hinged so as to define two lever arms, and two connecting rods (52, 53), each connecting rod (52, 53) being rotatingly coupled with a respective lever arm at one end and with a respective adjustment arm (3) at the other end.

2. The industrial slicer according to claim 1, wherein each blade (21, 22, 23) is attached at two points along the length thereof in the cutting station (1).

3. The slicer according to claim 2, wherein each shifter element (31) is interposed between the points of attachment of the respective blades (21, 22, 23).

4. The slicer according to claim 2, wherein said adjustment means (5, 7, 3, 31, 41) comprises a plurality of elastically bendable attachment elements (41) that retain the blades (21, 22, 23) at said points.

5. The slicer according to claim 1, wherein said arm (3) is hinged in the cutting station (1) at an axis of rotation and wherein the relative shifter elements (31) are arranged on respective circumferences having a centre at said axis of rotation.

6. The slicer according to claim 5, further comprising a conveyor that brings the products to the cutting station (1), along a conveying plane, wherein the blades (21, 22, 23), are arranged one over the other, the lowermost blade being separated from the conveying plane by a distance corresponding to the cutting pitch, at any given time, wherein the radiuses of said circumferences are such selected that, identifying the blades (21, 22, 23) from the lowest to the highest with a consecutive natural number starting from one, the size of the shift that each blade must carry out, with respect to the previous position following a change in the cutting pitch, is determined by the following formula: $S_N = \Delta S_1 \times N$, wherein N is said consecutive number, $\Delta S_1$ is the shift in the position of the first blade (21) with respect to said conveying plane and $S_N$ is the shift in the position of blade number N.

7. The slicer according to claim 1, comprising a conveyor that brings the products to the cutting station (1), along a conveying plane, wherein the blades (21, 22, 23), are arranged one over the other, the lowermost blade being separated from the conveying plane by a distance corresponding to the cutting pitch, at any given time.

8. The slicer according to claim 1, comprising:
    detection means for determining the dimensions of the products to be sliced, arranged upstream of the cutting station (1); and
    at least one processing unit, connected to said detection means and configured to control said adjustment means in such a way as to change the distance between said blades (21, 22, 23) automatically, according to the dimensions of the products to be sliced, based on a slicing program.

* * * * *